Jan. 5, 1943.  A. D. STEIDINGER  2,307,429
WATER EXPELLING TIRE ASSEMBLY
Filed Sept. 25, 1937    3 Sheets-Sheet 1
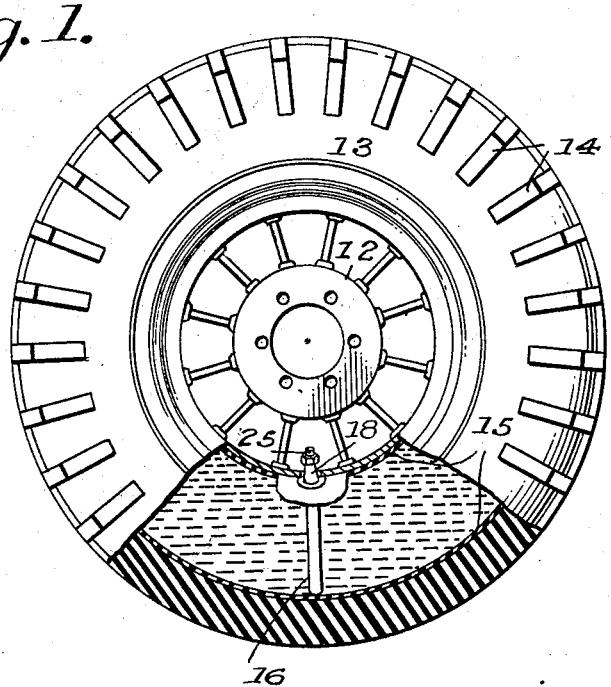
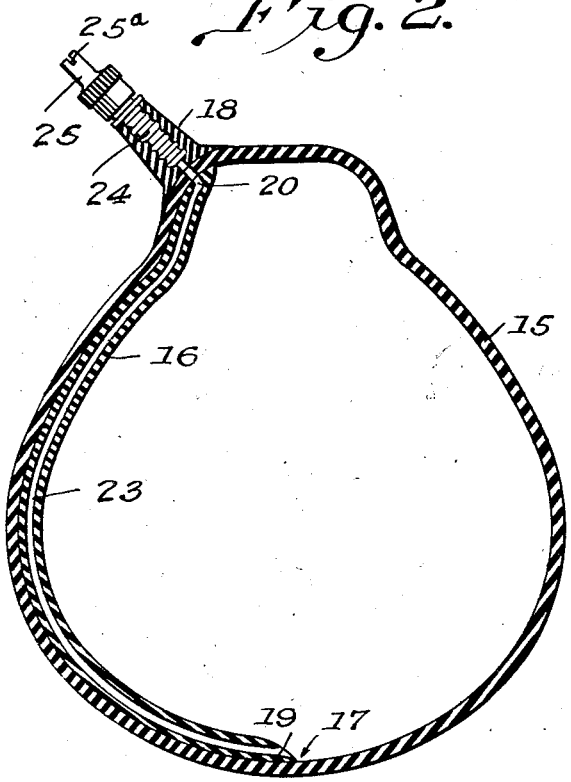
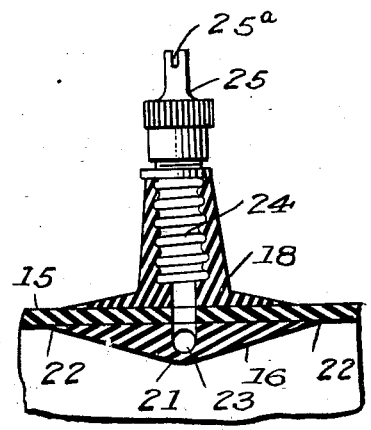
Inventor
AARON D. STEIDINGER

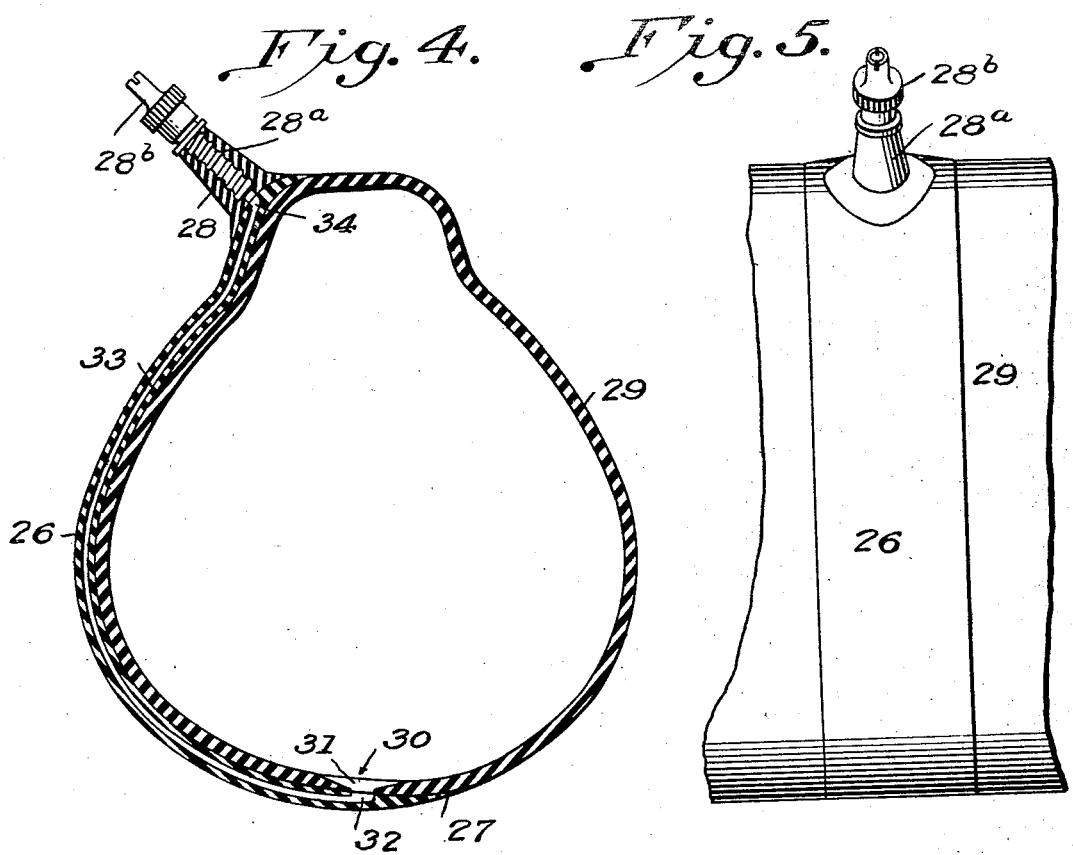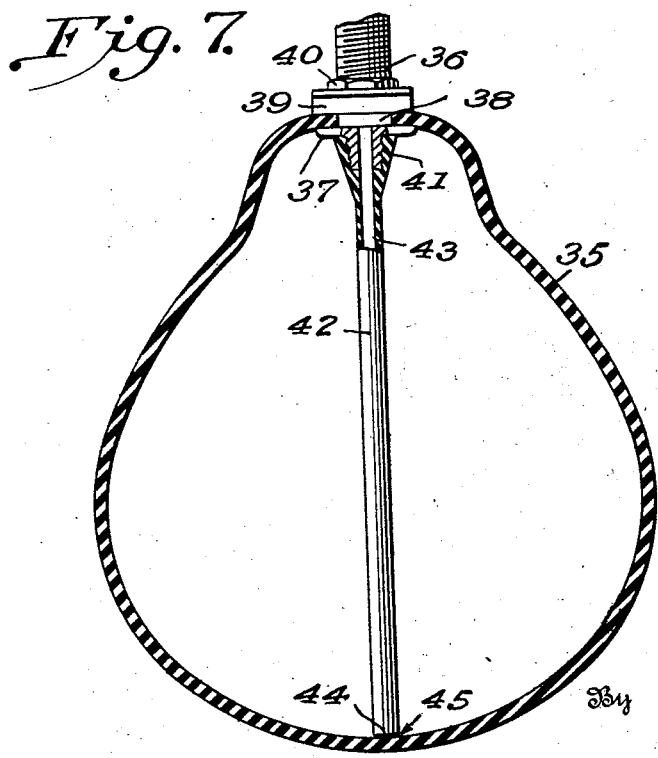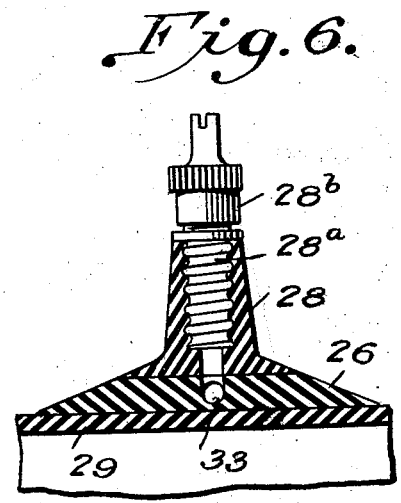

Jan. 5, 1943. A. D. STEIDINGER 2,307,429
WATER EXPELLING TIRE ASSEMBLY
Filed Sept. 25, 1937 3 Sheets-Sheet 3
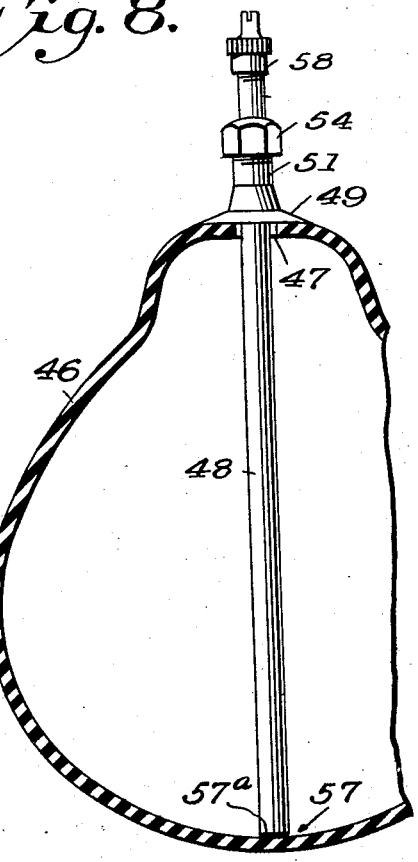
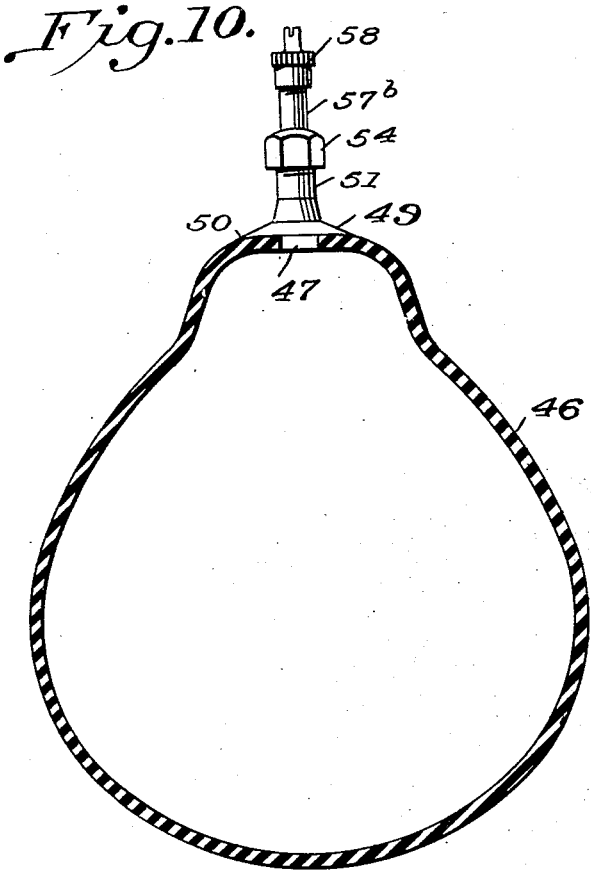
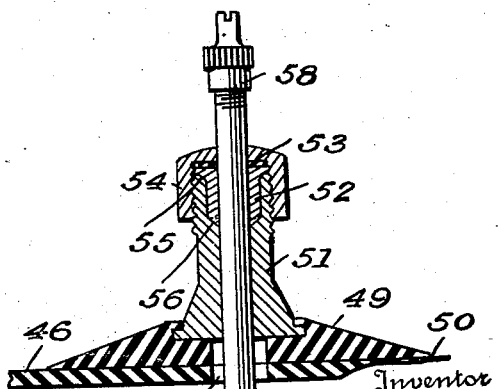
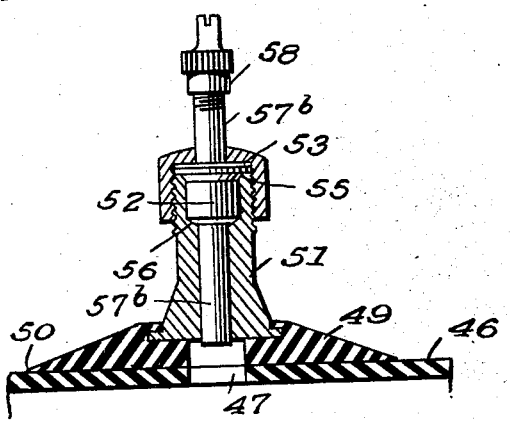
Inventor
AARON D. STEIDINGER
By La Porte & La Porte
Attorneys Patented Jan. 5, 1943

2,307,429

UNITED STATES PATENT OFFICE 2,307,429

WATER EXPELLING TIRE ASSEMBLY

Aaron D. Steidinger, Fairbury, Ill.

Application September 25, 1937, Serial No. 165,705

2 Claims. (Cl. 152—330)

This invention relates to tires of the pneumatic type having provision for removal from the tire of water used in the tire for weighting purposes, one example being the weighting of pneumatic tractor tires with water for the sake of greater traction and reduction of rebound.

For several years water has been used in such tires and it has been desired to remove it completely on occasion, to avoid the necessity of employing other expedients to prevent it from freezing in cold weather, for example, or to lighten the tractor and lessen fuel consumption when putting the tractor to a use not requiring the increased traction.

As the inflating stem is at the inner periphery of the inner tube, the pressure of air overlying the water in the tire can force out the water only down to the level of the junction of the inflating stem with the tube, whether the tire be positioned with the inflating stem at the high or at the low part of the wheel circle, and even though the outflow of water is interrupted from time to time to conduct additional air into the tire to compensate for water displaced from the tire and to keep the tire from going flat.

In spite of the fact that this problem of complete removal of the water from the tire has existed for several years and has been encountered by a great many operators of tractors, the only commonly used expedient for removing the last of the water, as far as I am aware, has been the use of a suction pump, with a nipple insertible through the valve-stem. It is of course advantageous to avoid the necessity of having a pump or other special appliance or part readily at hand at the time of evacuating the water, because of their being easily lost or damaged. Also the use of a pump involves the initial cost of the pump and is a slow operation.

The chief objects of my invention are to provide for complete removal of the water without a pump; to avoid the necessity of having a pump or special parts at hand when it is desired to remove the water; to provide for rapid removal of the water; and to provide conveniently for removal of the water without the necessity of either supporting the tire from the axle or permitting it to go flat.

Of the accompanying drawings:

Fig. 1 is a side elevation, but with parts in section, of a wheel and, mounted thereon, a tire equipped with an inner tube embodying my invention in one of its preferred forms.

Fig. 2 is a cross-section of the inner tube of Fig. 1, at the position of the valve stem.

Fig. 3 is a longitudinal fragmentary section of the same.

Fig. 4 is a cross-section, at the position of the valve stem, of an inner tube embodying my invention in a form slightly different from that of Figs. 1 to 3.

Fig. 5 is a fragmentary side elevation of the inner tube of Fig. 4.

Fig. 6 is a fragmentary longitudinal section of the inner tube of Figs. 4 and 5.

Fig. 7 is a cross-section of a modification.

Fig. 8 is a cross-section, with parts in elevation, of another modification.

Fig. 9 is a fragmentary longitudinal section, with parts in elevation, of the inner tube of Fig. 8.

Fig. 10 is a cross-section, with parts in elevation, of the inner tube of Figs. 8 and 9 as it appears when a valve assembly is substituted for the water-venting tube.

Fig. 11 is a fragmentary longitudinal section, with parts in elevation, of the inner tube of Figs. 8 to 10 as it appears when, as in Fig. 10, a valve assembly is substituted for the water-venting tube.

Referring first to Figs. 1 to 3 of the drawings, the wheel (Fig. 1) is designated 12, the tire casing 13, the tread design thereon 14, and the inner tube, embodying my invention, 15.

The innertube 15 is shown as having a rubber valve-stem 18 with a valve casing 24 therein, and a valve cap 25, notched at 25ª, for removal of the valve "insides" in case very rapid flow of the water from the inner tube is desired.

At 20 the air inlet passage of the valve stem is in sealed communication with the flow passage 23 of a rubber tube 16, here shown as of triangular cross-section (see Fig. 3) and lying within and adhered to the inner wall of the inner tube, the triangular tube 16 terminating, and the flow passage 23 communicating with the interior of the inner tube, at the middle of the tread zone of the inner tube, which is the lowest part of the chamber within the inner tube when the tractor is stopped with the valve stem at the lowest part of the wheel circle.

In this embodiment, with the wheel in the position just indicated, complete removal of the water requires only the opening, or removal, of the inflating valve, with interruption of the outflow of water for forcing more air into the tire if the volume and pressure of the air within the tire, over the water, were not sufficient at the beginning of the water-expelling operation to drive all of the water from the tire without permitting it to go flat.

In Figs. 4 to 6 the construction is substantially the same as that of Figs. 1 to 3 except that the inlet-outlet tube, 26, is exterior to the body of the inner tube, has a mouth 32 registered with an aperture 31 in the inner tube body at the point 30 of water accumulation, and communicates with the valve-stem aperture at 34.

In the embodiment of Fig. 7 the valve-stem 36 is provided, within the inner tube, with a nipple 41 upon which is mounted a flexible tube 42, preferably of rubber, which terminates at 44, at the position of water-accumulation 45, for the driving out of all of the water by the pressure of the air above it.

In Figs. 8 and 9, the inner tube has a metal valve-stem 51 which is formed with a packing-gland recess 56 occupied by a packing 52, which may be of rubber or of fibrous packing material, and which is adapted to be crowded against and to seal against a metal or rubber pipe 48 when a packing nut 54 is screwed down upon the valve-stem, the metal pipe 48 thus being sealed to the wall of the inner tube, through the packing member 52 and the valve stem 51. A washer 53 may be interposed between the inner end face of the packing nut 54 and the packing member 52.

This construction is such that the metal pipe 48 can be set at a low position for complete evacuation of the water, or at a high position to avoid puncture of the inner tube by the lower end of the metal pipe 48 in service. The upper end portion of the pipe 48 can contain the usual valve "insides."

Alternatively, the pipe 48 can be completely removed, between water-venting operations, and in its place, and in place of the packing member 52, can be employed a through-apertured filler member 52 having the usual valve "insides" in its upper portion 57b.

In all of the embodiments herein described the above stated objects are attained in high degree.

I claim:

1. In combination, an inner tube for a tire casing and having a controllable valve for both filling the tube with both water and compressed air, or evacuating the water at times, and an elastic conduit having its receiving end in communication with the valve, and its delivery end opposite the valve terminally secured to the inner wall thereof, the said delivery end being apertured immediately adjacent said inner wall, whereby when the valve is opened the compressed air within the inner tube will completely evacuate the water therefrom by way of the conduit, its terminal aperture and the valve.

2. In combination, a tractor tire, a tube therein having a valve device opening toward the center of the tire, an elastically flexible conduit leading from the inner end of the valve outwardly toward the opposite surface of the tube and connected thereto and opening into the tube at the inner face thereof, whereby when the tube is filled with water partially and also with compressed air partially, with the valve directed upwardly and opened, and the tire standing still, the compressed air will expel the water and itself from the tube by way of the conduit.

AARON D. STEIDINGER.